Feb. 14, 1933.    C. A. FORSSELL    1,897,470
SUSPENSION BRIDGE
Filed May 9, 1928    2 Sheets-Sheet 1
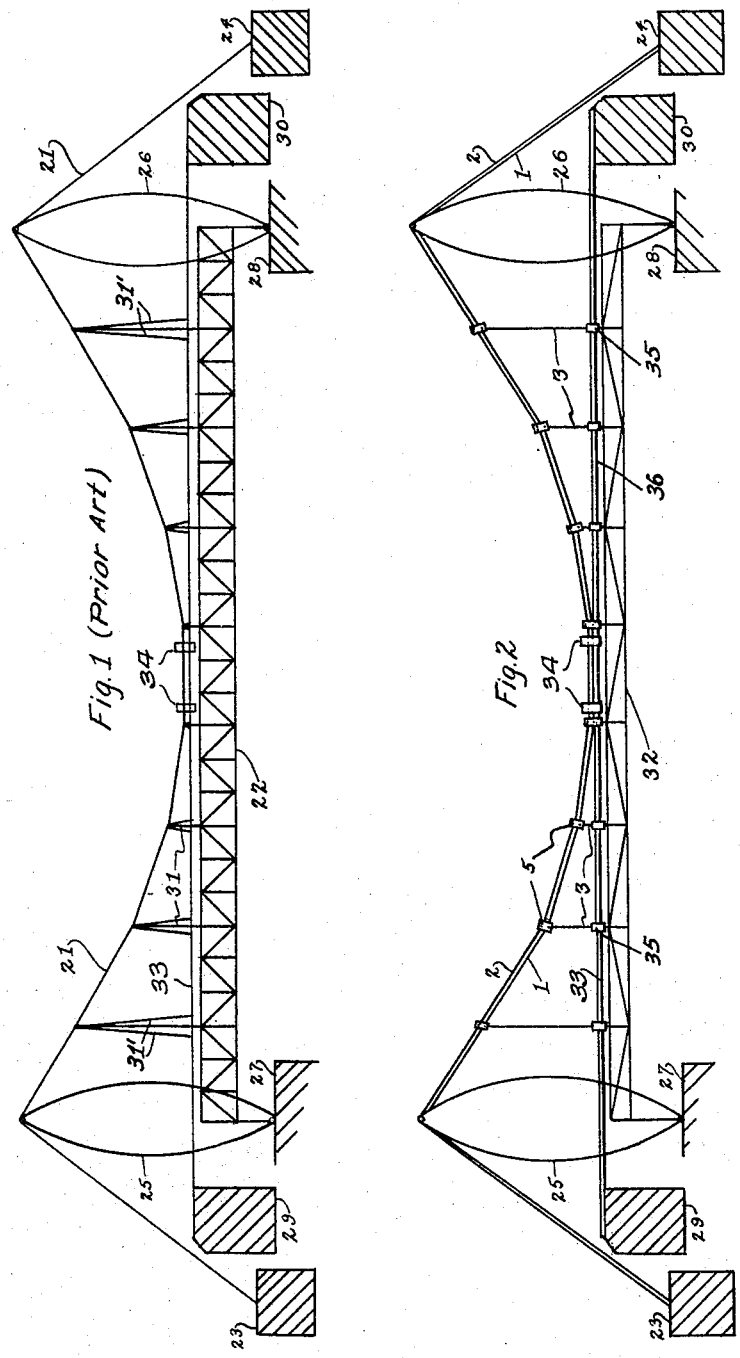
INVENTOR
Carl Abraham Forssell
BY 
ATTORNEY Feb. 14, 1933. C. A. FORSSELL 1,897,470
SUSPENSION BRIDGE
Filed May 9, 1928  2 Sheets-Sheet 2
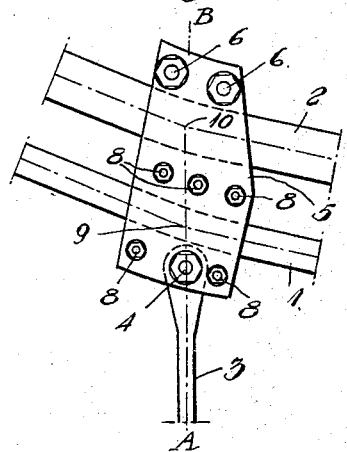
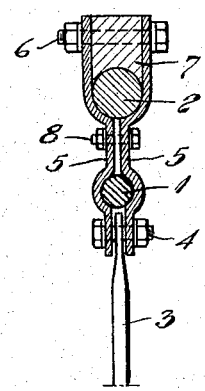
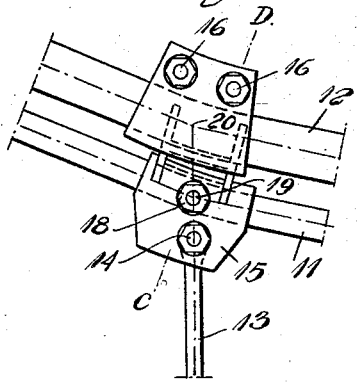
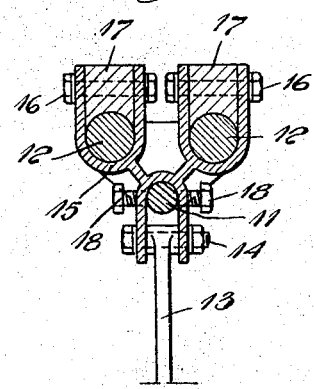
INVENTOR
CARL ABRAHAM FORSSELL
by
ATTORNEY Patented Feb. 14, 1933

1,897,470

UNITED STATES PATENT OFFICE

CARL ABRAHAM FORSSELL, OF STOCKHOLM, SWEDEN

SUSPENSION BRIDGE

Application filed May 9, 1928, Serial No. 276,349, and in Sweden May 10, 1927.

In the construction of suspension bridges it is already known to combine the carrying cables with stiffening cables which may be straight in the horizontal direction or, preferably, bent on the lines of parabolas, and which at certain parts are rigidly connected with the carrying cable in some way or other. The purpose of this arrangement is to reduce the moments produced in the stiffening girders. Such an arrangement is described in the Swedish Patent No. 45,143 to applicant.

The present invention relates to certain improvements in the said arrangement, and the invention consists in that one or more of the cables, whether carrying cables or stiffening cables, are replaced entirely by solid stays of round bar-iron or flat bar-iron or by stays of any other known type of construction, or, said cables may be constituted by ropes of steel, iron or other known material, combined with stays of said description and extending alongside of them.

By the said previously known arrangement, the advantage is obtained that the moments in the stiffening girders are reduced to a very low value at concentrated or unevenly distributed loads, the weight of the bridge and the costs thereof being also reduced in a corresponding degree. As long as the carrying cables are made in the form of ropes, primarily steel ropes, as has hitherto been the case, the low modulus of elasticity E of the cables, which is about 1,000,000 kilograms per square centimeter, will, in conjunction with the severe strain of about 4000 to 4,500 kilograms per square centimeter as generally used in these cables, and which strain is necessary to render the use of the cables economical, cause great deflections of the totally loaded bridge and a certain sense of weakness in the bridge, particularly under the load of a swinging motion. By replacing the cables, for instance, by stays of round bar-iron having a modulus of elasticity $E_1$ of approximately 2,150,000 kilograms per square centimeter and a strain of about 1,200 kilograms per square centimeter, the deflections are reduced in the proportion $$\frac{2,150,000}{1,000,000} \cdot \frac{4,000 \text{ to } 4,500}{1,200}$$

or about 7 to 8 times. Instead of a deflection, under a total movable load, of about 1:150 of the span, the deflection caused hereby, with round bar-irons in place of the cables, would be 1:1000 to 1:1200 of the span. Thus, a suspension bridge would be obtained of the rigidness which is required in bridges for common roads of traffic, for highways or railroads, where the deflection is generally permitted to be 1:600 to 1:1000, according to the type of bridge. By a combination of the arrangement of the carrying members in accordance with the said previously known construction, with carrying members made as solid stays, which arrangement is made use of in suspension bridges of the ordinary type, a suspension bridge is obtained which possesses all technical advantages of the girder bridge, while involving the cheapness of a suspension bridge according to the said previously known arrangement as set forth in the preamble hereinbefore.

In building the suspension bridge, the steel cables permit of a considerably simplified work. They may be pulled over in whole lengths and serve as a scaffold for the bridge which is suspended direct from the cable by its vertical stays. The same advantage is possessed by a cable comprising the combination of a steel rope and a solid stay, such as an iron stay, provided it is so arranged that the steel rope is adapted to be mounted alone and to serve as a scaffold, that is to say adapted to carry a load of at least so great a portion of the weight of the bridge construction that must be applied, in order that the bridge construction shall be geometrically fixed and provisionally passable, that is to say, the load of the cross beams, the stiffening girders and a light provisional footway, and provided further that the iron stay is so arranged as to be adapted to be mounted in its place in the construction carried by the steel rope. Taking advantage of this arrangement the bridge may be built as an ordinary suspension bridge with steel ropes. After the parts of construction of the bridge have thus been finished, with the exception, for instance, of the bridge deck, the insertion of the solid iron stays into their places is a comparatively simple task. The utilization of the steel rope simultaneously with the solid stay or stays extending alongside thereof may be simply effected so that permissible strains are attained in both at the same time. If the steel rope is strained under a permissible tension of 4000 kilograms per square centimeter and the iron stay under a tension of 1,200 kilograms per square centimeter, the dimensions may be selected so that the strain of the steel rope used as a scaffold will be, for instance 4000–1,200.

$$\frac{E}{E_1}$$

in the mounting of the iron stay. When the load is then increased so much that the strain in the stay is 1,200 kilograms per square centimeter, the strain will be 4,000 kilograms per square centimeter in the rope.

The means for transferring the load onto the cable at the loaded points may preferably be arranged in any known manner, for instance with the aid of two corner plates embracing the cable and facilitating attachment for the application of the load. These two corner plates may be so arranged as to provide space for the introduction of the solid stay between them after the said plates have been mounted in the final position. The attachment of this stay may then take place by cross joints between the corner plates, for instance by means of bolts. Great facilities for adapting corner plates of the same shape for different loading points is provided, if the bearing between the steel rope or the stay, or both, and the corner plates is mediated through a solidified mass, such as solidified cement, bush-metal or the like put in place by casting or by any known method. The surfaces of the corner plates at the bearing places may be provided with uneven parts to increase the strength of the joint.

At a point where load is applied to the cable, for instance at a vertical stay, there is an alteration of angles at the same, forming the breaking point according to the principles of the formation of polygons of forces. If the cable is composed of a plurality of parallel parts, there is an alteration of angles in each one of these, with a consequent force in each of them. The resultant of these forces must be the force applied to the whole cable. In order to control in a simple manner that the breaking points of the various parallel parts are correctly positioned, the arrangement may be such that the breaking point for all parts contained in a cable, such as a steel rope and an iron stay, is located in the same plane extending at right angles to the plane of the cable and through the line of action of the loading force. Where the cable is composed of a plurality of parts lying with their center lines in the same plane surface, the breaking points of the said parts will, at a certain point of load, be situated on the same straight line, which is the line of action of the loading force. In carrying cables the arrangement is preferably such that, where a steel rope is comprised, the latter is then disposed lowermost. Thus the advantage is obtained that iron stays disposed above the same may be simply mounted in place after the steel rope has been taken in use.

Reference is hereby made to the accompanying drawing in which similar elements are designated by similar reference numerals and wherein:

Fig. 1 illustrates diagrammatically a suspension bridge according to the aforementioned prior art.

Fig. 2 illustrates diagrammatically a suspension bridge according to the invention.

Fig. 3 is an elevation of a corner plate in position according to the invention.

Fig. 4 is a section on the line A—B of Fig. 3.

Fig. 5 is an elevation of a modified form of a corner plate in position according to the invention.

Fig. 6 is a section on the line C—D of Fig. 5.

Suspension bridges according to the known arrangement, as hereinbefore stated, are provided with carrying cables each consisting of a steel rope 21 (see Fig. 1) attached to anchors 23 and 24 and suspended from towers 25 and 26 which are supported on foundations 27 and 28. The stiffening girder 22 is supported at its ends on the same foundations 27 and 28 and is supported intermediately by vertical stays 31.

The stiffening cable 33 is attached to anchors 29 and 30 and attached to the carrying cable 21 by anchors 34 and is supported intermediately by vertical stays 31'.

In a suspension bridge according to the invention, however, the carrying cables in addition to the steel rope 1 comprise a bar-iron stay 2, said rope and stay being attached to anchors 23 and 24 (see Fig. 2) and being suspended from towers 25 and 26 which rest on foundations 27 and 28. The stiffening girder 32 is supported at its ends on the same foundations 27 and 28, but as previously explained may be of much lighter and weaker construction in view of the reduction of moments therein. Corner plates 5 are attached to rope 1 and stay 2 and also have vertical stays 3 depending from them, said vertical stays being attached to girder 32.

The stiffening cables may also comprise a steel rope 36 and a solid bar-iron stay 33 which are attached to anchors 29 and 30 and attached to the carrying cable 1 and stay 2 by anchors 34 and are supported intermediately by the vertical stays 3, which are connected to the stiffening cables by means of connecting members 35.

With reference to Figs. 3 and 4 of the drawing 1 designates a steel rope forming, together with the round bar-iron stay 2, a carrying cable for the suspension bridge. 3 is the vertical stay connected to the two corner plates 5 by means of the cross bolt 4. The round bar-iron stay 2 is retained in its position relatively to the corner plates by means of the cross bolts 6 and the solidified mass 7 such as solidified cement, bush-metal or the like. The corner plates are kept together not only by the cross bolts 4 and 6, but also by means of bolts 8. 9 and 10 are breaking points on the respective center lines of the steel rope 1 and the round bar-iron stay 2 respectively, said points coinciding with the center line of the vertical stay 3. Within the corner plates 5, soft bends are provided, as required, in the steel rope and the round bar-iron stay respectively.

Referring to Figs. 5 and 6, the steel rope 11 forms, together with the two round bar-iron stays 12, a carrying cable for the suspension bridge. 13 is the vertical stay connected to the corner plate 15 by means of the cross bolt 14. The round bar-iron stays 12 are retained in their positions relatively to the corner plate 15 by means of the cross bolts 16 and the solidified mass 17 such as solidified cement, bush-metal or the like. The steel rope is jammed fast in the corner plate 15 by means of the set screws 18. 19 and 20 are breaking points on the center lines of the steel rope 11 and the round bar-iron stay 12 respectively, said breaking points being situated on the center line of the vertical stay 13. Within the corner plate 15, soft bends are provided as required, in the steel rope and the round bar-iron stay respectively.

A bridge in accordance with the present invention would be assembled as follows:

The stranded steel rope or cable 1, Figures 1 and 2, is suspended in its position between the two towers 25, 26 in a known manner. The corner plates 5 having vertical stays 3 are placed on this cable. The cross beams, stiffening girders and stiffening cables are constructed at this time as well as a light footway. The bridge now forms a rigid structure suitable to permit the placing of the solid bar iron-stays 2 thereon. These solid stays are preferably round and of a diameter of about 3½ inches or less.

Said solid stays may be provided in sections of about 60 feet each being bent so as to fit into their position above the stranded cable. These sections may be joined in any suitable way such as by means of threaded ends and long nuts. The sections may be carried on the bridge over the previously constructed footway, hoisted into a position above the stranded cable and lowered vertically between the corner plates. The solid stays may be anchored in the towers in a known manner and are secured to the corner plates of the vertical stays by means of bolts and a solidified mass such as solidified cement, bush-metal or the like, as described. The solid stays may thus be erected one after the other so that the first erected aids in carrying those subsequently placed in position.

What I claim is:—

1. In a suspension bridge, the combination, with carrying cables comprising stranded steel ropes, of approximately straight and horizontal stiffening cables comprising solid bar-iron stays, and means providing for cooperation of said stiffening cables with said carrying cables, including a plurality of vertical stays and connecting anchors.

2. In a suspension bridge, the combination, with composite carrying cables comprising both stranded steel ropes and solid stays disposed along the same, of approximately straight and horizontal stiffening cables comprising solid stays, and means providing for cooperation of said carrying cables with said stiffening cables, including a plurality of vertical stays and connecting anchors.

3. In a suspension bridge, the combination, with composite carrying cables comprising both stranded steel ropes and solid stays disposed alongside the same, of approximately straight and horizontal stiffening cables comprising stranded steel ropes, and means providing for cooperation of said stiffening cables with said composite carrying cables, including a plurality of vertical stays and connecting anchors.

4. In a suspension bridge, the combination, with composite carrying cables comprising stranded steel ropes and solid stays disposed alongside the same, of approximately straight and horizontal composite stiffening cables also comprising stranded steel ropes and solid stays disposed alongside the same, and means providing for cooperation of said composite stiffening cables with said composite carrying cables, including a plurality of vertical stays and connecting anchors.

5. In a suspension bridge, the combination, with composite carrying cables comprising both stranded steel ropes and solid stays of iron disposed alongside the same, of approximately straight and horizontal composite stiffening cables also comprising both stranded steel ropes and solid stays of iron disposed alongside the same, and means providing for cooperation of said composite stiffening cables with said composite carrying cables, including a plurality of vertical stays and connecting anchors.

6. In a suspension bridge, the combination, with composite carrying cables comprising stranded steel ropes and solid stays disposed alongside the same, of approximately straight and horizontal stiffening cables, and means providing for cooperation of said stiffening cables with said composite carrying cables, including a plurality of vertical stays attached thereto and also a plurality of connecting anchors, said steel ropes being adapted both to be initially mounted along and to carry the load of at least so great a portion of the weight of the bridge structure that must be applied to render said structure geometrically fixed, and said stays being adapted to be subsequently mounted in place in the structure initially carried solely by the steel ropes.

7. In a suspension bridge, the combination, with composite carrying cables comprising stranded steel ropes and solid stays disposed alongside the same, of approximately straight and horizontal stiffening cables, and means providing for cooperation of said stiffening cables with said composite carrying cables, including a plurality of vertical stays attached thereto and also a plurality of connecting anchors, the breaking points of all constituent parts of said composite carrying cables being located, at a loaded point such as at the location of a vertical stay, in the same plane extending at right angles to the plane of the cable and through the line of action of the loading force.

8. In a suspension bridge, the combination, with composite carrying cables comprising stranded steel ropes and solid stays disposed alongside the same, of approximately straight and horizontal stiffening cables, and means providing for cooperation of said stiffening cables with said composite carrying cables, including a plurality of vertical stays attached thereto and also a plurality of connecting anchors, the stays and ropes of said composite carrying cables having their center lines located in the same plane extending through the line of action of the loading force.

9. In a suspension bridge, the combination, with approximately straight and horizontal stiffening cables, of composite carrying cables, each comprising a stranded steel rope and a solid iron stay disposed along the length of the stranded rope above the same, and means providing for cooperation of the stiffening cables with the composite carrying cables including a plurality of vertical stays and connecting anchors.

In testimony whereof I affix my signature.

CARL ABRAHAM FORSSELL.